US012532120B2

(12) United States Patent
Yang et al.

(10) Patent No.: US 12,532,120 B2
(45) Date of Patent: Jan. 20, 2026

(54) SPEAKER MODULE AND ASSEMBLING METHOD THEREOF

(71) Applicants: AAC ACOUSTIC TECHNOLOGIES (SHENZHEN) CO., LTD., Shenzhen (CN); AAC Microtech (Changzhou) Co., Ltd., Changzhou (CN)

(72) Inventors: Haijuan Yang, Shenzhen (CN); Lei Wang, Shenzhen (CN); Shuwen Wu, Shenzhen (CN)

(73) Assignees: AAC ACOUSTIC TECHNOLOGIES (SHENZHEN) CO., LTD., Guangdong (CN); AAC Microtech (Changzhou) Co., Ltd., Jiangsu (CN)

( * ) Notice: Subject to any disclaimer, the term of this patent is extended or adjusted under 35 U.S.C. 154(b) by 33 days.

(21) Appl. No.: 17/918,902

(22) PCT Filed: Jun. 10, 2022

(86) PCT No.: PCT/CN2022/098087
§ 371 (c)(1),
(2) Date: Oct. 14, 2022

(87) PCT Pub. No.: WO2023/226094
PCT Pub. Date: Nov. 30, 2023

(65) Prior Publication Data

US 2025/0080916 A1 Mar. 6, 2025

(30) Foreign Application Priority Data

May 24, 2022 (CN) ........................ 202210570346.X

(51) Int. Cl.
*H04R 9/02* (2006.01)
*H04R 7/04* (2006.01)
(Continued)

(52) U.S. Cl.
CPC ............... *H04R 9/022* (2013.01); *H04R 7/04* (2013.01); *H04R 9/06* (2013.01); *H04R 31/00* (2013.01)

(58) Field of Classification Search
CPC ................ H04R 1/2857; H04R 1/2842; H04R 2499/11; H04R 9/063; H04R 9/10;
(Continued)

(56) References Cited

U.S. PATENT DOCUMENTS 10,225,645 B1 * 3/2019 Lv .......................... H04R 1/021
10,255,645 B1 * 4/2019 Christensen ........... G06Q 20/14
(Continued)

FOREIGN PATENT DOCUMENTS

CN 213126469 U * 5/2021 ............... H04R 9/06

*Primary Examiner* — Carolyn R Edwards
*Assistant Examiner* — Julie X Dang
(74) *Attorney, Agent, or Firm* — Wiersch Law Group

(57) ABSTRACT

A speaker module and an assembling method of the speaker module includes a housing, a vibration system, and a magnetic circuit system. An accommodation space is defined in the housing, and the vibration system and the magnetic circuit system are accommodated in the accommodation space. The housing includes a frame, an upper cover plate, and a lower cover plate. The frame includes a side wall. When the upper cover plate and the lower cover plate are assembled on the frame, the frame, the upper cover plate, and the lower cover plate form an outer housing. An assembling process of the speaker module is simplified from two separate assembly processes of the speaker monomer and the speaker module into single assemble process of the speaker module, which reduces processing difficulty and cost.

7 Claims, 6 Drawing Sheets

A—A

(51) Int. Cl.
*H04R 9/06* (2006.01)
*H04R 31/00* (2006.01)

(58) Field of Classification Search
CPC .... H04R 9/025; H04R 1/24; H04R 2209/026; H04R 1/025; H04R 1/02; H04R 2400/11; H04R 1/2811; H04R 1/2849; H04R 2209/027; H04R 9/022; H04R 7/04; H04R 9/06; H04R 31/00
USPC ....... 381/386, 400, 401, 402, 403, 405, 406, 381/409, 410, 411, 412
See application file for complete search history.

(56) References Cited

U.S. PATENT DOCUMENTS

| | | | | |
|---|---|---|---|---|
| 2018/0213319 | A1* | 7/2018 | Qin | H04R 1/2857 |
| 2019/0215612 | A1* | 7/2019 | Cao | H04R 9/025 |
| 2020/0053470 | A1* | 2/2020 | Gu | H04R 1/2811 |
| 2020/0213754 | A1* | 7/2020 | Wang | H04R 1/02 |
| 2021/0037313 | A1* | 2/2021 | Cho | H04R 1/2834 |
| 2021/0235185 | A1* | 7/2021 | Qin | H04R 9/022 |
| 2023/0142874 | A1* | 5/2023 | Feng | H04R 9/06 381/353 |

* cited by examiner

SPEAKER MODULE AND ASSEMBLING METHOD THEREOF

TECHNICAL FIELD

The present disclosure relates to the field of electroacoustic technology, and in particular to a speaker module and an assembling method thereof.

BACKGROUND

With the rapid development of science and technology, a penetration rate of audio devices is increasing, requirements of people for the audio devices are not limited to video playback, but also put forward more requirements for reliability of the audio devices. Especially in the 4G era, mobile multimedia technology has further been developed, and there are many audio devices having a variety of entertainment functions, such as video playback, digital video, games, global positioning system (GPS) navigation, etc., requirements for the audio devices to play sound quality are increasingly high.

A speaker module is a common electronic component, and is mainly configured to play audio signals. In the related art, an assembling process of the loudspeaker module is generally divided into two processes, a first process is to assemble a speaker monomer, and a second process is to assemble the speaker module, which is greatly difficult in operation and high in cost.

Therefore, it is necessary to provide a speaker module to solve above technical problems.

SUMMARY

The present disclosure aims to provide a speaker module and assembling method thereof to solve problems in the related art at least to a certain extent.

Technical solutions of the present disclosure are as following.

The present disclosure provides a speaker module, including a housing, a vibration system, and a magnetic circuit system. An accommodation space is defined in the housing, and the vibration system and the magnetic circuit system are accommodated in the accommodation space. The vibration system includes a vibrating diaphragm, a voice coil, and a circuit board. The voice coil is connected to the vibrating diaphragm for driving the vibrating diaphragm to vibrate, and the circuit board is connected to one end of the voice coil. The magnetic circuit system includes a magnetic bowl and a magnetic steel assembly. The magnetic steel assembly is disposed on the magnetic bowl, a magnetic gap is formed in the magnetic steel assembly, and the voice coil is inserted into the magnetic gap. The housing includes a frame, an upper cover plate, and a lower cover plate, and the upper cover plate and the lower cover plate cover two opposite sides of the frame. The frame includes a side wall, where the side wall extends along a vibration direction of the vibrating diaphragm. The vibrating diaphragm, the circuit board, and the magnetic bowl are erected on the side wall. The upper cover plate, the vibration system, and the frame enclose to form a front sound cavity, and the lower cover plate, the vibration system, the magnetic circuit system, and the frame enclose to form a rear sound cavity.

Furthermore, the side wall includes an outer wall and a supporting wall, the outer wall extends along the vibration direction of the vibrating diaphragm, and the supporting wall extends along the vibration direction of the vibrating diaphragm and is spaced apart from the outer wall. The lower cover plate covers a first side of the outer wall, the upper cover plate covers a second side of the outer wall, where the second side of the outer wall faces away from the lower cover plate. The circuit board and the magnetic bowl are erected on the supporting wall.

Furthermore, the outer wall includes a first end surface and a first groove. The first end surface faces the lower cover plate and the first groove is recessed from the first end surface towards a direction distal from the lower cover plate, and the lower cover plate covers the first groove.

Furthermore, the outer wall further includes a second groove, a first inner wall surface, and a second inner wall surface. The second groove is recessed from the first groove towards the direction distal from the lower cover plate. The first inner wall surface and the second inner wall surface are connected to the supporting wall and are oppositely disposed.

The supporting wall includes a second end surface and a third groove. The second end surface faces the lower cover plate, and the third groove is recessed from the second end surface towards the direction distal from the lower cover plate. The second groove and the third groove are oppositely disposed, and two ends of the magnetic bowl are respectively disposed on the second groove and the third groove.

The frame further includes a clamping plate, the clamping plate is disposed on the first inner wall surface and the second inner wall surface, and the magnetic steel assembly is disposed on the clamping plate.

Furthermore, the frame includes a fourth end surface, and the fourth end surface is distal from the lower cover plate. A fourth groove is recessed from the fourth end surface towards a direction distal from the upper cover plate, and the upper cover plate covers the fourth groove.

Furthermore, the outer wall further includes a first inner wall surface, a second inner wall surface, and a third inner wall surface. The first inner wall surface and the second inner wall surface are connected to the supporting wall and are oppositely disposed, and the third inner wall surface is connected to the first inner wall surface and the second inner wall surface. A fifth groove is recessed from the fourth groove, along the third inner wall surface and the supporting surface, towards the direction distal from the upper cover plate.

The vibration system further includes an elastic connecting member, the elastic connecting member is disposed on the circuit board. The vibrating diaphragm is disposed between the upper cover plate and the fourth groove, one side of the elastic connecting member is connected to one side, distal from the vibrating diaphragm, of the voice coil, and the circuit board is disposed on the fifth groove.

Furthermore, the upper cover plate includes a ventilation hole. The speaker module further includes a first breathable film, the first breathable film is disposed on one side, distal from the lower cover plate, of the upper cover plate. The first breathable film covers the ventilation hole, and the ventilation hole is communicated with the front sound cavity.

Furthermore, the lower cover plate includes a through hole. The speaker module further includes a second breathable film, the second breathable film covers the through hole, and the through hole is communicated with the rear sound cavity.

Furthermore, an air guide hole is defined on the magnetic bowl, the air guide hole is communicated with the front sound cavity and the rear sound cavity. The speaker module further includes a third breathable film, the third breathable film covers the air guide hole.

The present disclosure further provides an assembling method of the speaker module mentioned above, including following steps:

assembling the upper cover plate, the vibrating diaphragm, and the voice coil into a whole, and covering the whole of the upper cover plate, the vibrating diaphragm, and the voice coil on the side wall of the frame;

assembling the magnetic bowl and the magnetic steel assembly into a whole, and assembling the whole of the magnetic bowl and the magnetic steel assembly on one side, distal from the vibrating diaphragm, of the side wall; and covering the lower cover plate on one side, distal from the upper cover plate, of the frame.

Beneficial effects of the present disclosure are as following.

The present disclosure provides the speaker module, including the housing, the vibration system, and the magnetic circuit system. The accommodation space is defined in the housing, and the vibration system and the magnetic circuit system are accommodated in the accommodation space. The vibration system includes the vibrating diaphragm, the voice coil, and the circuit board. The voice coil is connected to the vibrating diaphragm for driving the vibrating diaphragm to vibrate, and the circuit board is connected to one end of the voice coil. The magnetic circuit system includes the magnetic bowl and the magnetic steel assembly. The magnetic steel assembly is disposed on the magnetic bowl, the magnetic gap is formed in the magnetic steel assembly, and the voice coil is inserted into the magnetic gap. The housing includes the frame, the upper cover plate, and the lower cover plate, and the upper cover plate and the lower cover plate cover the two opposite sides of the frame. The frame includes the side wall, where the side wall extends along the vibration direction of the vibrating diaphragm. The vibrating diaphragm, the circuit board, and the magnetic bowl are erected on the side wall. The upper cover plate, the vibration system, and the frame enclose to form the front sound cavity, and the lower cover plate, the vibration system, the magnetic circuit system, and the frame enclose to form the rear sound cavity. The frame of the speaker module of the present disclosure includes the side wall. When the upper cover plate and the lower cover plate are assembled on the frame, the frame, the upper cover plate, and the lower cover plate form an outer housing of the speaker module. Specifically, the upper cover plate and the vibration system are assembled on a first side of the frame, the magnetic circuit system is assembled on a second side of the frame, and then the lower cover plate is directly covered to complete assembly. That is, an assembling process of the speaker module of the present disclosure is simplified from two separate assembly processes of a speaker monomer and a speaker module into single assemble process of the speaker module, which reduces processing difficulty and cost.

DETAILED DESCRIPTION OF EMBODIMENTS

Figure 1:
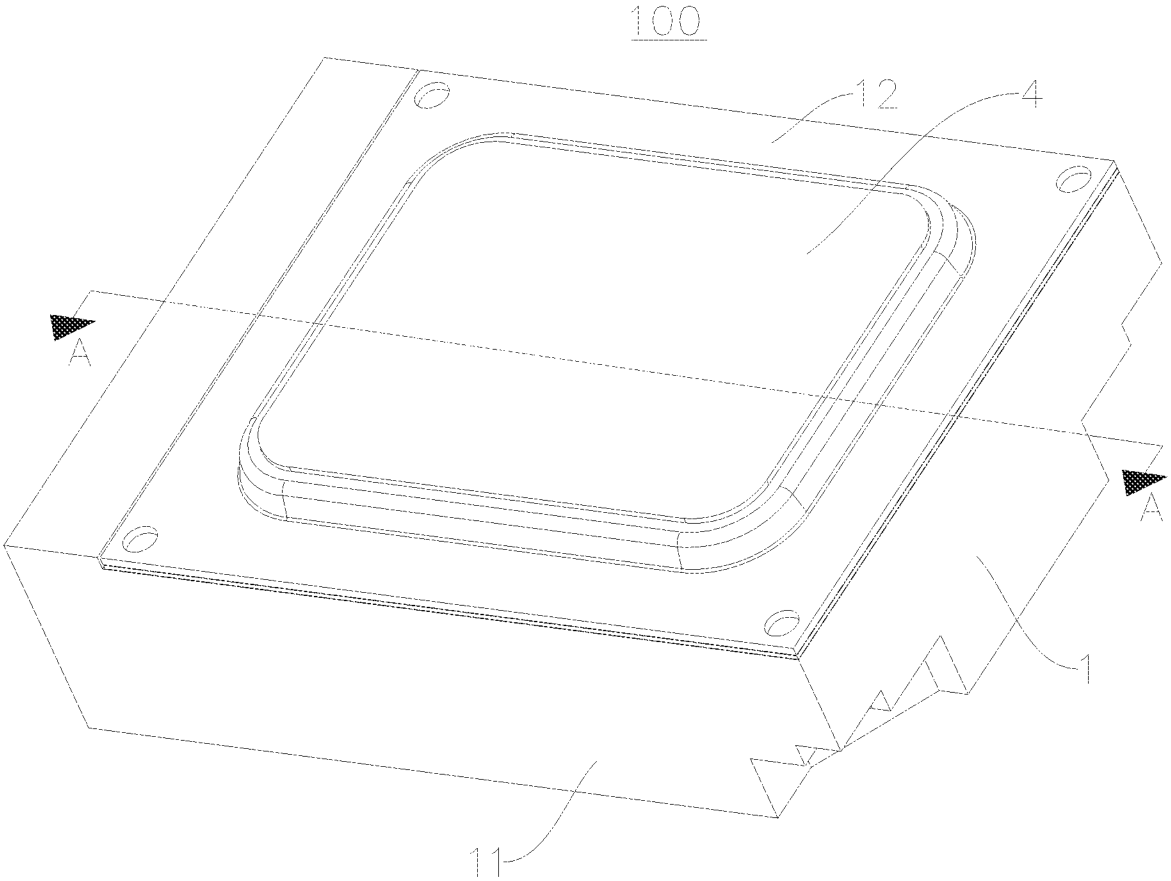
FIG. 1 is a structural schematic diagram of a first angle of a speaker module of the present disclosure.
Figure 2:
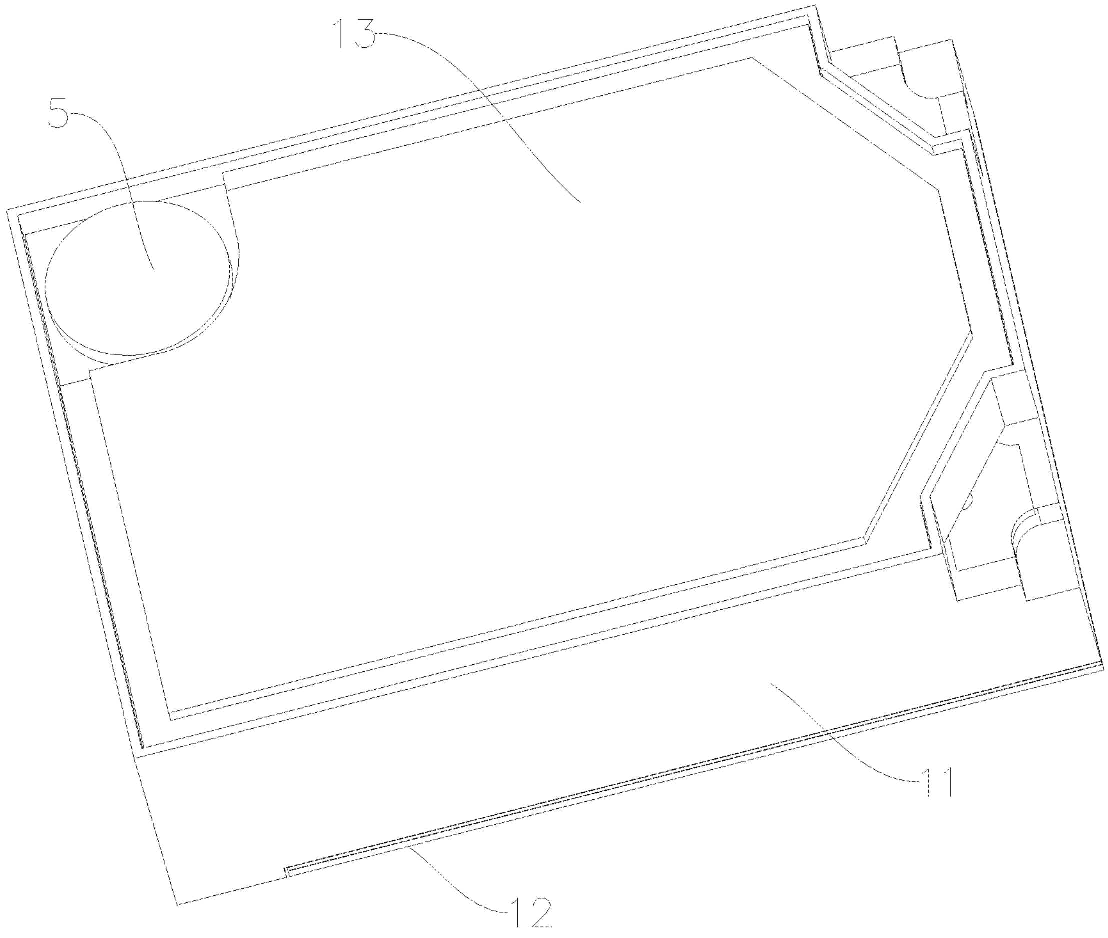
FIG. 2 is a structural schematic diagram of a second angle of the speaker module of the present disclosure.
Figure 3:
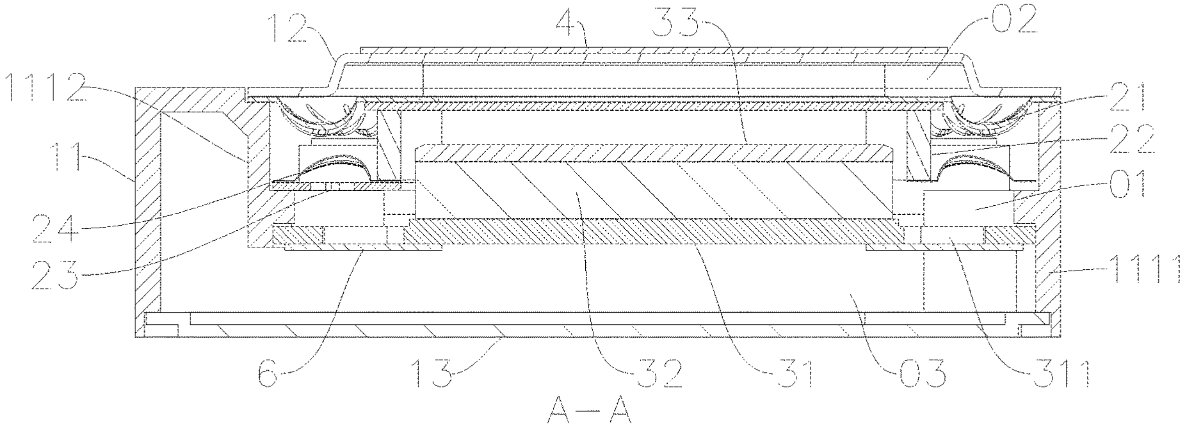
FIG. 3 is a cross-sectional schematic diagram taken along the line A-A shown in the speaker module of FIG. 2.
Figure 4:
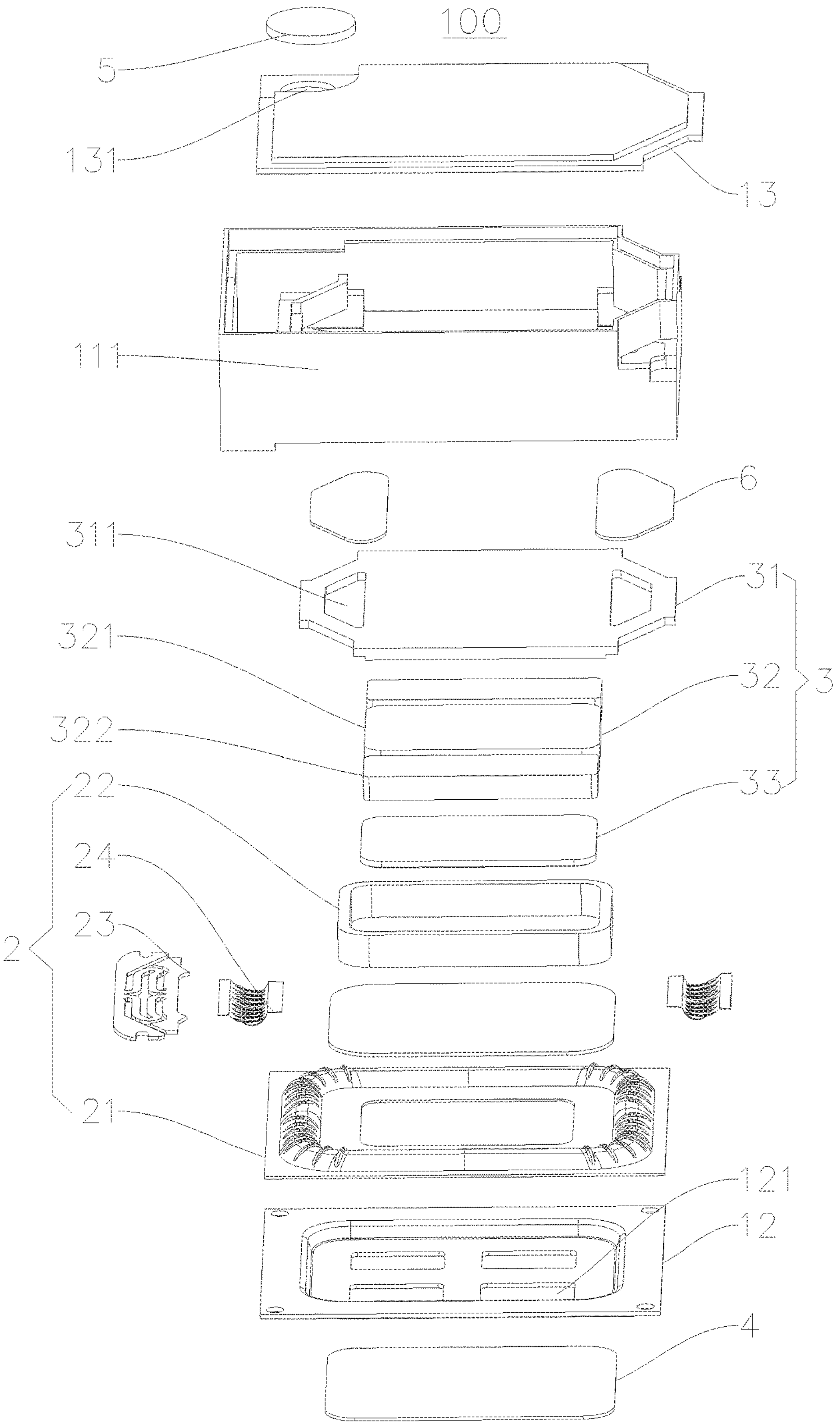
FIG. 4 is an exploded schematic diagram of the speaker module of the present disclosure.

The present disclosure is further described below with reference to the accompanying drawings and embodiments.

As shown in FIGS. 1-4, the present disclosure provides a speaker module 100, including a housing 1, a vibration system 2, and a magnetic circuit system 3. An accommodation space 01 is defined in the housing 1, and the vibration system 2 and the magnetic circuit system 3 are accommodated in the accommodation space 01. The vibration system 2 includes a vibrating diaphragm 21, a voice coil 22, and a circuit board 23. The voice coil 22 is connected to the vibrating diaphragm 21 for driving the vibrating diaphragm 21 to vibrate, and the circuit board 23 is connected to one end of the voice coil 22. The magnetic circuit system 3 includes a magnetic bowl 31, a magnetic steel assembly 32, and a pole core 33. The magnetic steel assembly 32 is disposed on the magnetic bowl 31, magnetic gap is formed in the magnetic steel assembly 32, the pole core 33 is disposed on one side, distal from the magnetic bowl 31, of the magnetic steel assembly 32, and the voice coil 22 is inserted into the magnetic gap. The magnetic steel assembly 32 includes a master magnetic steel 321 and a secondary magnetic steel 322, the master magnetic steel 321 is centrally disposed, the secondary magnetic steel 322 is disposed around the master magnetic steel 321, and the magnetic gap is formed between the master magnetic steel 321 and the secondary magnetic steel 322. The housing 1 includes a frame 11, an upper cover plate 12, and a lower cover plate 13, and the upper cover plate 12 and the lower cover plate 13 cover two opposite sides of the frame 11. The frame 11 includes a side wall 111, where the side wall 111 extends along a vibration direction of the vibrating diaphragm 21. The vibrating diaphragm 21, the circuit board 23, and the magnetic bowl 31 are erected on the side wall 111. The upper cover plate 12, the vibration system 2, and the frame 11 enclose to form a front sound cavity 02, and the lower cover plate 13, the vibration system 2, the magnetic circuit system 3, and the frame 11 enclose to form a rear sound cavity 03.

The frame 11 of the speaker module 100 of the present disclosure includes the side wall 111. When the upper cover plate 12 and the lower cover plate 13 are assembled on the frame 11, the frame 11, the upper cover plate 12, and the lower cover plate 13 form an outer housing of the speaker module 100. Specifically, the upper cover plate 12 and the vibration system 2 are assembled on a first side of the frame 11, the magnetic circuit system 3 is assembled on a second side of the frame 11, and then the lower cover plate 13 is directly covered to complete assembly. That is, an assembling process of the speaker module of the present disclosure is simplified from two separate assembly processes of a speaker monomer and a speaker module into single assemble process of the speaker module, which reduces processing difficulty and cost.

Furthermore, the side wall 111 includes an outer wall 1111 and a supporting wall 1112, the outer wall 1111 extends along the vibration direction of the vibrating diaphragm 21, and the supporting wall 1112 extends along the vibration direction of the vibrating diaphragm 21 and is spaced apart from the outer wall 1111. The lower cover plate 13 covers a first side of the outer wall 1111, the upper cover plate 12 covers a second side of the outer wall 13, where the second side of the outer wall 1111 faces away from the lower cover plate 13. The circuit board 23 and the magnetic bowl 31 are erected on the supporting wall 1112.

In the embodiment, the frame 11 includes a hollow structure 112 and a bottom frame 113, the hollow structure 112 is located on the bottom frame 13, and the hollow structure 112 is configured to accommodate the vibration system 2 and the magnetic circuit system 3. The outer wall 1111 and the supporting wall 1112 are formed on the bottom frame 113. The supporting wall 1112 is located at one of outer edges of the hollow structure 112 and is spaced apart from one side of the outer wall 1111. Rest of the outer edges of the hollow structure 112 coincides with the vibration direction of the vibrating diaphragm 21. Certainly, in other embodiments, the rest of the outer edges of the hollow structure 112 may partially coincide with the vibration direction of the vibrating diaphragm 21. A height of the outer wall 111 is larger than a height of the supporting wall 1112, the supporting wall 1112 is located in an area defined by the outer wall 1111. The vibration system 3 and the magnetic circuit system 3 are disposed in the hollow structure 112 and are erected on the supporting wall 1112 and the outer wall 1111. Since both the supporting wall 1112 and the outer wall 1111 are integrally formed on the bottom frame 113, compared with speaker modules in the related art, the speaker module 100 of the present disclosure reduces difficulty of forming the upper cover plate 12 and the lower cover plate 13. Meanwhile, since the frame 11 is in an integral forming structure, the lower cover plate 13, the vibration system 2, the magnetic circuit system 3, the outer wall 1111, and the supporting wall 1112 form the rear sound cavity 03 to be connected more tightly, thereby improving leakproofness of the rear sound cavity 03 and reducing a risk of air leakage.

Figure 5:
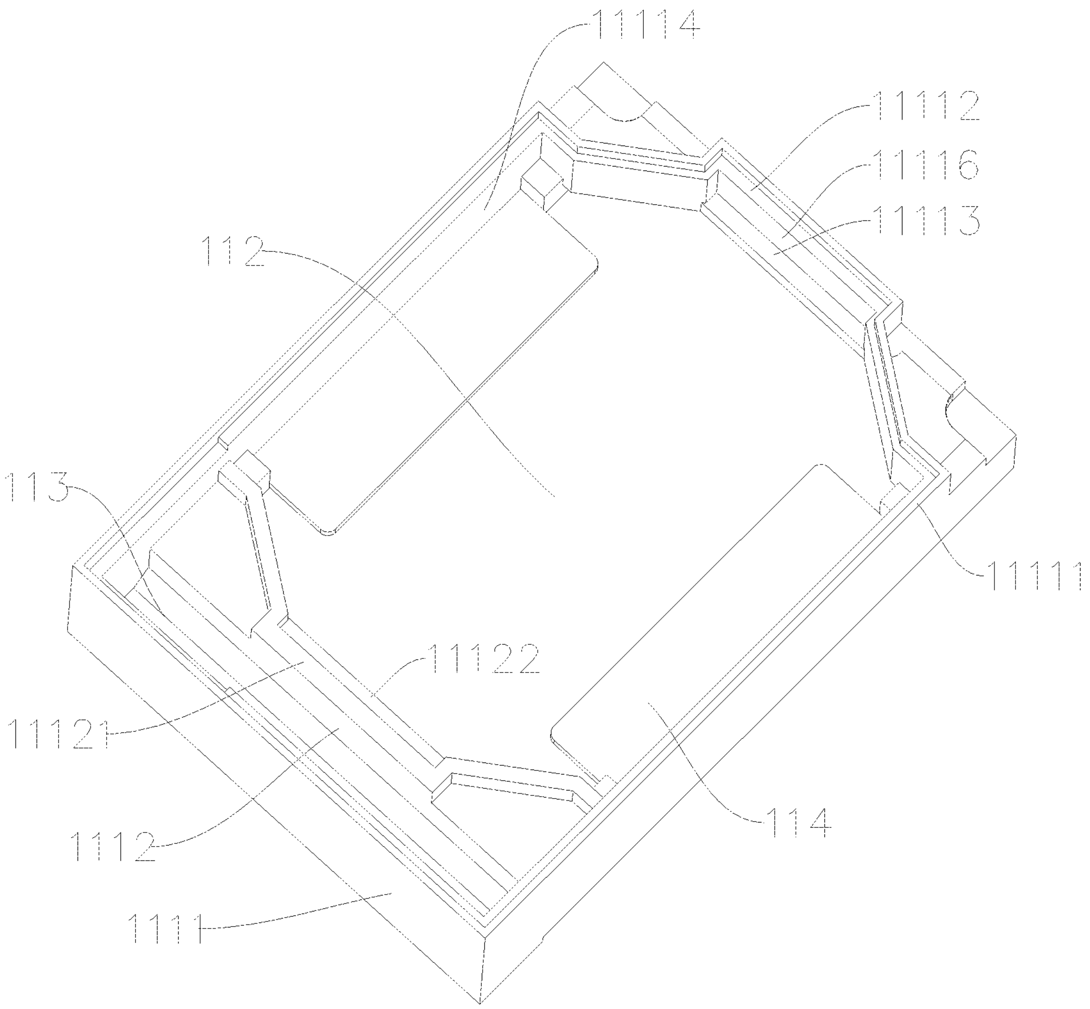
FIG. 5 is a structural schematic diagram of a first angle of a frame of the present disclosure.

Furthermore, as shown in FIG. 5, the outer wall 1111 includes a first end surface 11111 and a first groove 11112. The first end surface 11111 faces the lower cover plate 13 and the first groove 11112 is recessed from the first end surface 11111 towards a direction distal from the lower cover plate 13, and the lower cover plate 13 covers the first groove 11112.

In the embodiment, the first groove 11112 is recessed from the first end surface 11111 towards the direction distal from the lower cover plate 13, a shape of the first groove 11112 is matched with the lower cover plate 12, which is convenient for covering the lower cover plate 13 on the first groove 11112. Furthermore, a depth of the first groove 11112 is larger than a thickness of the lower cover plate 13, so that when the lower cover plate 13 covers the first groove 11112, the rear sound cavity 03 is formed by enclosing the lower cover plate 13 and the vibration system 2, the magnetic circuit system 3, the outer wall 1111, and the supporting wall 1112, thereby ensuring the leakproofness of the rear sound cavity 03.

Figure 6:
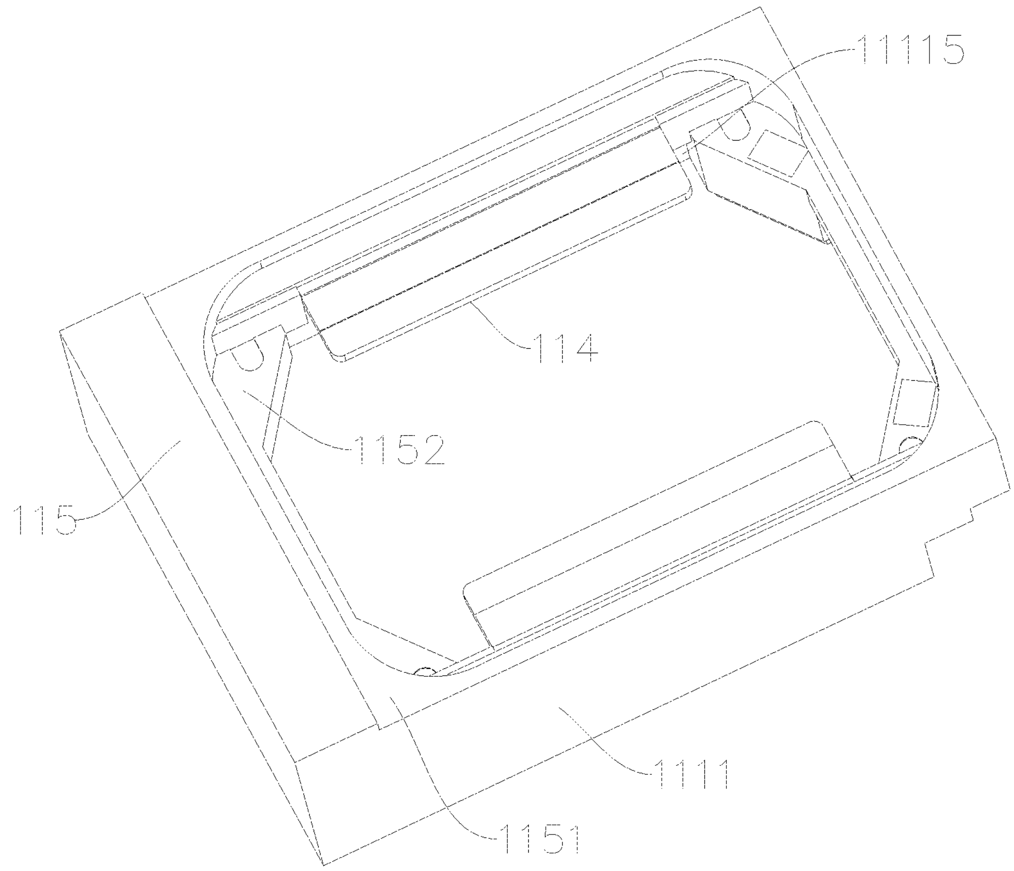
FIG. 6 is a structural schematic diagram of a second angle of the frame of the present disclosure.

Furthermore, as shown in FIGS. 5-6, the outer wall 1111 further includes a second groove 11113, a first inner wall surface 11114, and a second inner wall surface 11115. The second groove 11113 is recessed from the first groove 11112 towards the direction distal from the lower cover plate 13. The first inner wall surface 11114 and the second inner wall surface 11115 are connected to the supporting wall 1112 and are oppositely disposed. The supporting wall 1112 includes a second end surface 11121 and a third groove 11122. The second end surface 11121 faces the lower cover plate 13, and the third groove 11122 is recessed from the second end surface 11121 towards the direction distal from the lower cover plate 13. The second groove 11113 and the third groove 11122 are oppositely disposed, and two ends of the magnetic bowl 31 are respectively disposed on the second groove 11113 and the third groove 11122. The frame 11 further includes a clamping plate 114, the clamping plate 114 is disposed on the first inner wall surface 11114 and the second inner wall surface 11115, and the magnetic steel assembly 32 is disposed on the clamping plate 114.

In the embodiment, the outer wall 1111 further includes a third inner wall surface 11116, the third inner wall surface 11116 is connected to the first inner wall surface 11114 and the second inner wall surface 11115. The second groove 11113 is disposed at the third inner wall surface 11116 of the outer wall, and a depth of the second groove 11113 is larger than the depth of the first groove 11112. Furthermore, in the embodiment, the third inner wall surface 11116 is disposed along the outer edges of the hollow structure 112, and at this time, a connection, between the third inner wall surface 11116 and the second inner wall surface 11115, and a connection, between the third inner wall surface 11116 and the first inner wall surface 11114 are also disposed along the outer edges of the hollow structure 112. Similarly, a connection, between the supporting wall 1112 and the first inner wall surface 11114, and a connection, between the supporting wall 1112 and the second inner wall surface 11115 are disposed along the outer edges of the hollow structure 112, and the third groove 11122 of the supporting wall 1112 and the second groove 11113 of the third inner wall surface 11116 are symmetrically disposed. When the two ends of the magnetic bowl 31 are respectively disposed on the second groove 11113 and the third groove 11122, the magnetic bowl is more exactly matched with a structure of the magnetic circuit system 3, which has a more compact structure and may not waste materials. Moreover, the clamping plate 114 is disposed on the first inner wall surface 11114 and the second inner wall surface 11115, and the clamping plate 114 is located in the hollow structure 112 for supporting the magnetic steel assembly 32.

Furthermore, as shown in FIG. 6, the frame 11 includes a fourth end surface 115, and the fourth end surface 116 is distal from the lower cover plate 13. A fourth groove 1151 is recessed from the fourth end surface 115 towards a direction distal from the upper cover plate 12, and the upper cover plate 12 covers the fourth groove 1151.

In the embodiment, the fourth groove 1151 is recessed from the fourth end surface 115 towards the direction distal from the upper cover plate 12, a shape of the fourth groove 1151 is matched with the upper cover plate 12, which is convenient for covering the upper cover plate 12 on the fourth groove 1151. Furthermore, when the upper cover plate 12 covers the fourth groove 1151, the upper cover plate 12 is flush with a notch of the fourth groove 1151, so that the upper cover plate 12 is more exactly matched with the frame 11, and appearance of which is more aesthetic.

Furthermore, the outer wall 1111 further includes a first inner wall surface 11114, a second inner wall surface 11115, and a third inner wall surface 11116. The first inner wall surface 11114 and the second inner wall surface 11115 are connected to the supporting wall 1112 and are oppositely disposed, and the third inner wall surface 11116 is connected to the first inner wall surface 11114 and the second inner wall surface 11115. A fifth groove 1152 is recessed from the fourth groove 1151, along the third inner wall surface 11116 and the supporting surface 1112, towards the direction distal from the upper cover plate 12. The vibration system 2 further includes an elastic connecting member 24, the elastic connecting member 24 is disposed on the circuit board 23. The vibrating diaphragm 21 is disposed between the upper cover plate 12 and the fourth groove 1151, one side of the elastic connecting member 24 is connected to one side, distal from the vibrating diaphragm 21, of the voice coil 22, and the circuit board 23 is disposed on the fifth groove 1152.

In the embodiment, the fifth groove 1152 is recessed from the fourth groove 1151, along the third inner wall surface 11116 and the supporting surface 1112, towards the direction distal from the upper cover plate 12. At this time, a bottom end of the supporting wall 1112 and the outer wall 1111 are located at a position of a bottom end of the third inner wall surface 11116, where the position of the bottom end of the third inner wall surface 11116 protrudes from the hollow structure 112, which is convenient for placing the circuit board 23 and the elastic connecting member and further supports the circuit board 23 and the elastic connecting member 24. Moreover, the vibrating diaphragm 21 is disposed between the fourth groove 1151 and the upper cover plate 12, the voice coil 22 is disposed between the vibrating diaphragm 21 and the elastic connecting member, and the voice coil 22 is disposed at the magnetic gap of the magnetic steel assembly 32.

Furthermore, the upper cover plate 12 includes a ventilation hole 121. The speaker module 100 further includes a first breathable film 4, the first breathable film 4 is disposed on one side, distal from the lower cover plate 13, of the upper cover plate 12. The first breathable film 4 covers the ventilation hole 121, and the ventilation hole 121 is communicated with the front sound cavity 02.

In the embodiment, the ventilation hole 121 is communicated with the front sound cavity 02 for releasing heat generated by vibration of the voice coil 22, and the first breathable film 4 is disposed at the ventilation hole 121 and covers the ventilation hole 121 to prevent impurities, such as dust, in the air from entering the front sound cavity 02 through the ventilation hole 121.

Furthermore, the lower cover plate 13 includes a through hole 131. The speaker module 100 further includes a second breathable film 5, the second breathable film 5 covers the through hole 131, and the through hole 131 is communicated with the rear sound cavity 03.

In the embodiment, the through hole 131 is communicated with the rear sound cavity 03 for filling sound absorbing particles into the rear sound cavity 03 and for releasing air between the rear sound cavity 03 and the front sound cavity 02 to balance air pressure between the rear sound cavity 03 and the front sound cavity 02, so that acoustic performance of the loudspeaker module 100 is improved, the second breathable film 5 is disposed on the through hole 131 and covers the through hole 131 for preventing the impurities, such as the dust, in the air from entering the rear sound cavity 03 through the through hole 131.

Furthermore, an air guide hole 311 is defined on the magnetic bowl 31, the air guide hole 311 is communicated with the front sound cavity 02 and the rear sound cavity 3. The speaker module 100 further includes a third breathable film 6, the third breathable film 6 covers the air guide hole 311.

In the embodiment, the front sound cavity 02 and the rear sound cavity 03 are communicated through the air guide hole 311 for balancing air pressure in the loudspeaker module 100 to improve the acoustic performance of the loudspeaker module 100.

The present disclosure further provides an assembling method of the speaker module mentioned above, including following steps:

S110: assembling the upper cover plate 12, the vibrating diaphragm 21, and the voice coil 22 into a whole, and covering the whole of the upper cover plate 12, the vibrating diaphragm 21, and the voice coil 22 on the side wall 111 of the frame 11;

S120: assembling the magnetic bowl 31 and the magnetic steel assembly 32 into a whole, and assembling the whole of the magnetic bowl 31 and the magnetic steel assembly 32 on one side, distal from the vibrating diaphragm 21, of the side wall 111; and

S130: covering the lower cover plate 13 on one side, distal from the upper cover plate 12, of the frame 11.

The assembling method of the speaker module is simplified from two separate assembly processes of the speaker monomer and the speaker module into single assemble process of the speaker module of the present disclosure, which reduces the processing difficulty and the cost.

Based on above, the present disclosure provides the speaker module and the assembling method thereof. The frame of the speaker module of the present disclosure includes the side wall. When the upper cover plate and the lower cover plate are assembled on the frame, the frame, the upper cover plate, and the lower cover plate form the outer housing of the speaker module. The upper cover plate and the vibration system are assembled on the first side of the frame, the magnetic circuit system is assembled on the second side of the frame, and then the lower cover plate is directly covered to complete assembly. That is, the assembling process of the speaker module of the present disclosure is simplified from two separate assembly processes of the speaker monomer and the speaker module into single assemble process of the speaker module of the present disclosure, which reduces processing difficulty and cost. Meanwhile, the leakproofness of the rear sound cavity is improved, the risk of air leakage is reduced, and the difficulty of forming the upper cover plate and the lower cover plate is further reduced.

The foregoing are merely embodiments of the present disclosure, and it should be noted that, for those who skilled in the art, improvements can be made without departing from the concepts of the present disclosure, but these are all within the protection scopes of the present disclosure.

What is claimed is:

1. A speaker module, comprising:

a housing;

a vibration system; and a magnetic circuit system;

wherein an accommodation space is defined in the housing, and the vibration system and the magnetic circuit system are accommodated in the accommodation space; the vibration system comprises a vibrating diaphragm, a voice coil, and a circuit board; the voice coil is connected to the vibrating diaphragm for driving the vibrating diaphragm to vibrate, and the circuit board is connected to one end of the voice coil; the magnetic circuit system comprises a magnetic bowl and a magnetic steel assembly; the magnetic steel assembly is disposed on the magnetic bowl, a magnetic gap is formed in the magnetic steel assembly, and the voice coil is inserted into the magnetic gap; the housing is composed of a frame, an upper cover plate, and a lower cover plate, and the upper cover plate and the lower cover plate cover two opposite sides of the frame; the frame comprises a side wall, where the side wall extends along a vibration direction of the vibrating diaphragm; the vibrating diaphragm, the circuit board, and the magnetic bowl are erected on the side wall; the upper cover plate, the vibration system, and the frame enclose to form a front sound cavity; and the lower cover plate, the vibration system, the magnetic circuit system, and the frame enclose to form a rear sound cavity;

the side wall comprises an outer wall and a supporting wall, the outer wall extends along the vibration direction of the vibrating diaphragm, and the supporting wall extends along the vibration direction of the vibrating diaphragm and is spaced apart from the outer wall; the lower cover plate covers a first side of the outer wall, the upper cover plate covers a second side of the outer wall, where the second side of the outer wall faces away from the lower cover plate; and the circuit board and the magnetic bowl are erected on the supporting wall;

the outer wall comprises a first end surface and a first groove; the first end surface faces the lower cover plate and the first groove is recessed from the first end surface towards a direction distal from the lower cover plate; and the lower cover plate covers the first groove;

the outer wall further comprises a second groove, a first inner wall surface, and a second inner wall surface; the second groove is recessed from the first groove towards the direction distal from the lower cover plate; the first inner wall surface and the second inner wall surface are connected to the supporting wall and are oppositely disposed;

the supporting wall comprises a second end surface and a third groove; the second end surface faces the lower cover plate, and the third groove is recessed from the second end surface towards the direction distal from the lower cover plate; the second groove and the third groove are oppositely disposed, and two ends of the magnetic bowl are respectively disposed on the second groove and the third groove; and the frame further comprises a clamping plate, the clamping plate is disposed on the first inner wall surface and the second inner wall surface, and the magnetic steel assembly is disposed on the clamping plate.

2. The speaker module according to claim 1, wherein the frame comprises a fourth end surface, and the fourth end surface is distal from the lower cover plate; a fourth groove is recessed from the fourth end surface towards a direction distal from the upper cover plate; and the upper cover plate covers the fourth groove.

3. The speaker module according to claim 2, wherein the outer wall further comprises a first inner wall surface, a second inner wall surface, and a third inner wall surface; the first inner wall surface and the second inner wall surface are connected to the supporting wall and are oppositely disposed, and the third inner wall surface is connected to the first inner wall surface and the second inner wall surface; a fifth groove is recessed from the fourth groove, along the third inner wall surface and the supporting surface, towards the direction distal from the upper cover plate; and the vibration system further comprises an elastic connecting member, the elastic connecting member is disposed on the circuit board; the vibrating diaphragm is disposed between the upper cover plate and the fourth groove, one side of the elastic connecting member is connected to one side, distal from the vibrating diaphragm, of the voice coil, and the circuit board is disposed on the fifth groove.

4. The speaker module according to claim 1, wherein the upper cover plate comprises a ventilation hole; the speaker module further comprises a first breathable film, the first breathable film is disposed on one side, distal from the lower cover plate, of the upper cover plate; the first breathable film covers the ventilation hole, and the ventilation hole is communicated with the front sound cavity.

5. The speaker module according to claim 1, wherein the lower cover plate comprises a through hole; the speaker module further comprises a second breathable film, the second breathable film covers the through hole, and the through hole is communicated with the rear sound cavity.

6. The speaker module according to claim 1, wherein an air guide hole is defined on the magnetic bowl, the air guide hole is communicated with the front sound cavity and the rear sound cavity; the speaker module further comprises a third breathable film, the third breathable film covers the air guide hole.

7. An assembling method of the speaker module according to claim 1, comprising following steps:

assembling the upper cover plate, the vibrating diaphragm, and the voice coil into a whole, and covering the whole of the upper cover plate, the vibrating diaphragm, and the voice coil on the side wall of the frame;

assembling the magnetic bowl and the magnetic steel assembly into a whole, and assembling the whole of the magnetic bowl and the magnetic steel assembly on one side, distal from the vibrating diaphragm, of the side wall; and covering the lower cover plate on one side, distal from the upper cover plate, of the frame.

* * * * *